US008544031B2

(12) United States Patent
Clarke

(10) Patent No.: US 8,544,031 B2
(45) Date of Patent: *Sep. 24, 2013

(54) USE OF MODES FOR COMPUTER CLUSTER MANAGEMENT

(75) Inventor: Michael P. Clarke, Ellenbrook (AU)

(73) Assignee: International Business Machines Corporation, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 13/402,270

(22) Filed: Feb. 22, 2012

(65) Prior Publication Data

US 2012/0151503 A1  Jun. 14, 2012

Related U.S. Application Data

(63) Continuation of application No. 11/955,190, filed on Dec. 12, 2007, now Pat. No. 8,171,501.

(51) Int. Cl.
*G06F 3/00* (2006.01)

(52) U.S. Cl.
USPC .............................. 719/320; 712/220; 718/100

(58) Field of Classification Search
None
See application file for complete search history.

(56) References Cited

U.S. PATENT DOCUMENTS

| | | | |
|---|---|---|---|
| 6,314,526 B1 | 11/2001 | Arendt et al. | |
| 6,701,453 B2 | 3/2004 | Chrabaszcz | |
| 6,789,101 B2 | 9/2004 | Clarke et al. | |
| 7,457,236 B2 | 11/2008 | Cheng et al. | |
| 7,478,149 B2 | 1/2009 | Joshi et al. | |
| 7,490,323 B2 | 2/2009 | D'Alo et al. | |
| 7,689,862 B1 | 3/2010 | Bharthulwar et al. | |
| 7,797,566 B2 | 9/2010 | Dror et al. | |
| 8,171,501 B2 | 5/2012 | Clarke | |
| 2001/0056554 A1 | 12/2001 | Chrabaszcz | |
| 2003/0126240 A1* | 7/2003 | Vosseler | 709/221 |
| 2004/0153708 A1 | 8/2004 | Joshi et al. | |
| 2005/0198275 A1 | 9/2005 | D'Alo et al. | |
| 2005/0223010 A1* | 10/2005 | Murray | 707/10 |
| 2005/0237926 A1 | 10/2005 | Cheng et al. | |
| 2008/0016386 A1 | 1/2008 | Dror et al. | |
| 2009/0158016 A1 | 6/2009 | Clarke | |

OTHER PUBLICATIONS

USPTO Office Action regarding U.S. Appl. No. 11/955,190, dated Aug. 2, 2011, 19 pages.
USPTO Response to Office Action regarding U.S. Appl. No. 11/955,190, dated Oct. 25, 2011, 25 pages.
USPTO Notice of Allowance regarding U.S. Appl. No. 11/955,190, dated Dec. 28, 2011, 23 pages.

* cited by examiner

*Primary Examiner* — Emerson Puente
*Assistant Examiner* — Dong Kim
(74) *Attorney, Agent, or Firm* — Jeffrey S. LaBaw; Yee & Associates, P.C.

(57) ABSTRACT

A system, method and computer program product for managing a plurality of applications in a computer cluster. Each application is able to run on a particular node in the cluster. In one embodiment, associations are maintained among a plurality of modes and the plurality of applications, with each application being associated with at least one mode. Responsive to designation of at least one mode as active for the cluster, each application that is associated with an active mode is flagged as eligible for activation, each inactive application that is not associated with any active mode is flagged as ineligible for activation, and each active application that is not associated with any active mode is flagged as ineligible for activation and inactivated. Flagging as eligible, flagging as ineligible and flagging as ineligible and inactivating may be performed in any order, and inactivating is sequenced according to dependencies among the applications.

15 Claims, 6 Drawing Sheets

USE OF MODES FOR COMPUTER CLUSTER MANAGEMENT

CROSS-REFERENCE TO RELATED APPLICATIONS

This application is a continuation of and claims the benefit of priority to U.S. application Ser. No. 11/955,190, filed on Dec. 12, 2007 and entitled "Use of Modes for Computer Cluster Management", status allowed. Incorporation is made herein by reference.

FIELD OF THE INVENTION

The present invention relates to management of computer clusters, and more particularly to the use of modes to facilitate management of computer clusters.

BACKGROUND OF THE INVENTION

In modern computing, computers are frequently arranged into "clusters" of one or more computers, with each computer comprising one or more "nodes". For example, a computer cluster may comprise one or more individual computers each hosting a single node or a computer cluster may comprise one or more individual computers each running software that enables a single processor in that computer to function as two or more nodes. Different computer programs may run on different nodes within a cluster, and the nodes typically communicate with one another. For example, two or more nodes may share data, such as by accessing a common storage Clusters of two or more computers can be used to provide redundancy in data processing applications. Where only a single computer is used, if that single computer were to fail for any reason, then the computer programs running on that computer will not be available until the computer is successfully restarted. However, if an instance of a certain computer program were running on particular node within a cluster of two or more computers, and that node were to fail (e.g. because of a computer crash) such that the instance of that computer program that was running on that node was no longer available, another instance of that computer program could be made available, or continue to be made available, on another node. As a result, the data processing functions provided by that computer program would continue to be available to the computer cluster. Typically, critical computer programs would run concurrently, with multiple instances running across multiple nodes, so that a failure will result only in a reduction in capacity, rather than a total loss of the service provided by that computer program.

In practice, there are often dependencies among computer programs that run on nodes within a computer cluster. For example, there are frequently circumstances in which a first computer program requires the services of a second computer program, and will not operate correctly unless the second computer program is already running at the time the first computer program is activated. Such dependencies can be very complex, as a computer program may depend on multiple other computer programs, and some or all of those other computer programs may have their own dependencies, either among each other or with still further computer programs. Fortunately, some solutions for automating the management of these dependencies are available. Such solutions include IBM® Tivoli® System Automation for z/OS®, described in an IBM document having the same title, and IBM Tivoli System Automation for Multiplatforms, also described in an IBM document having the same title. IBM, Tivoli and z/OS are trademarks or registered trademarks of International Business Machines Corporation in the United States, other countries, or both. One technique which can be used to facilitate management of computer clusters is described in U.S. Pat. No. 6,789,101.

In addition to the issue of dependencies, the personnel who maintain a computer cluster often need to make changes to the workload profile of that computer cluster (i.e. which computer programs are active on which nodes within the cluster), which, even in the presence of automated dependency management, can be difficult, time-consuming and error prone, especially where the changes are complex or extensive.

SUMMARY OF THE INVENTION

In one aspect, the present invention is directed to a method for managing a plurality of applications in a computer cluster, with each application being able to run on a particular node in the computer cluster. Associations are maintained among a plurality of modes and the plurality of applications, with each application being associated with at least one mode. Responsive to designation of at least one mode in the plurality of modes as active for the computer cluster so that there is at least one active mode for the computer cluster, each application that is associated with an active mode is flagged as eligible for activation, each application that is inactive and is not associated with any active mode is flagged as ineligible for activation, and each application that is active and is not associated with any active mode is flagged as ineligible for activation and inactivated. The steps of flagging as eligible, flagging as ineligible and flagging as ineligible for activation and inactivating may be performed in any order, and the inactivating is sequenced according to dependencies among the applications.

In an embodiment, the computer cluster comprises a plurality of nodes hosted by a plurality of physical computers.

In an embodiment, the plurality of modes includes an on-demand mode that is deemed to be always active, and at least one application in the plurality of applications is associated with the on-demand mode to form at least one on-demand application. In this embodiment, each on-demand application is activated when such on-demand application is required and each on-demand application is inactivated only when such on-demand application is not required. The activating and inactivating of each on-demand application is independent of any active mode other than the on-demand mode.

In an embodiment, associations are maintained among at least one application group within the plurality of applications and at least one mode in the plurality of modes, and each such application group is associated with at least one mode. In one instance of this embodiment, responsive to designation of the at least one mode in the plurality of modes as active for the computer cluster, each application that is inactive and that is not flagged as ineligible for activation and is a member of an application group that is not associated with any active mode is flagged as ineligible for activation even if that application is individually associated with an active mode, and each application that is active and is a member of an application group that is not associated with any active mode is flagged as ineligible for activation and inactivated even if that application is individually associated with an active mode. Flagging as ineligible and flagging as ineligible and inactivating may be performed in any order, the inactivating is sequenced according to dependencies among the applications and membership of applications in groups and association of groups with modes are coordinated so as to be non-conflicting.

In an embodiment, the plurality of modes includes a mode which is always active.

In an embodiment, the plurality of modes includes a default mode that is initially assigned to new applications introduced into the computer cluster.

In an embodiment, the plurality of modes includes at least one recovery mode, with each recovery mode being associated with a set of nodes that are related to one another. Responsive to a threshold number of nodes in a set of nodes becoming unavailable, an appropriate recovery mode associated with the set of nodes that includes the threshold number of unavailable nodes is designated as active for the computer cluster so that at least one application that is equivalent to at least one corresponding application that had been available on at least one node in the threshold number of unavailable nodes becomes available on another node in the computer cluster that is external to the set of nodes that includes the threshold number of unavailable nodes.

In another aspect, the present invention is directed to a method for managing a plurality of applications in a computer cluster, with each application being able to run on a particular node in the computer cluster. Associations are maintained among at least one application group within the plurality of applications and at least one mode in a plurality of modes, with each such application group being associated with at least one mode. Responsive to designation of at least one mode in the plurality of modes as active for the computer cluster so that there is at least one active mode for the computer cluster, each application that is a member of an application group that is associated with any active mode is flagged as eligible for activation, and each application, other than any on-demand applications, that is inactive and is a member of an application group that is not associated with any active mode is flagged as ineligible for activation, and each application, other than any on-demand applications, that is active and is a member of an application group that is not associated with any active mode is flagged as ineligible for activation and inactivated. Flagging as eligible, flagging as ineligible and flagging as ineligible and inactivating may be performed in any order, the inactivating is sequenced according to dependencies among the applications, and membership of applications in application groups and association of application groups with modes are coordinated so as to be non-conflicting.

In one embodiment, each application group comprises two or more applications.

In other aspects, the present invention is directed to systems and computer program products for implementing the above-described methods.

DETAILED DESCRIPTION

Computers in a computer cluster are typically powerful servers, such as pSeries® and zSeries® servers offered by International Business Machines Corporation of Armonk, N.Y., but may also be more conventional personal computers (pSeries and zSeries are trademarks or registered trademarks of International Business Machines Corporation in the United States, other countries, or both). The type and number of computers used will affect the capacity of the computer cluster. For example, a computer cluster consisting of a single zSeries server may have greater capacity than a cluster of several personal computers, depending on the workload distribution.

Figure 1:
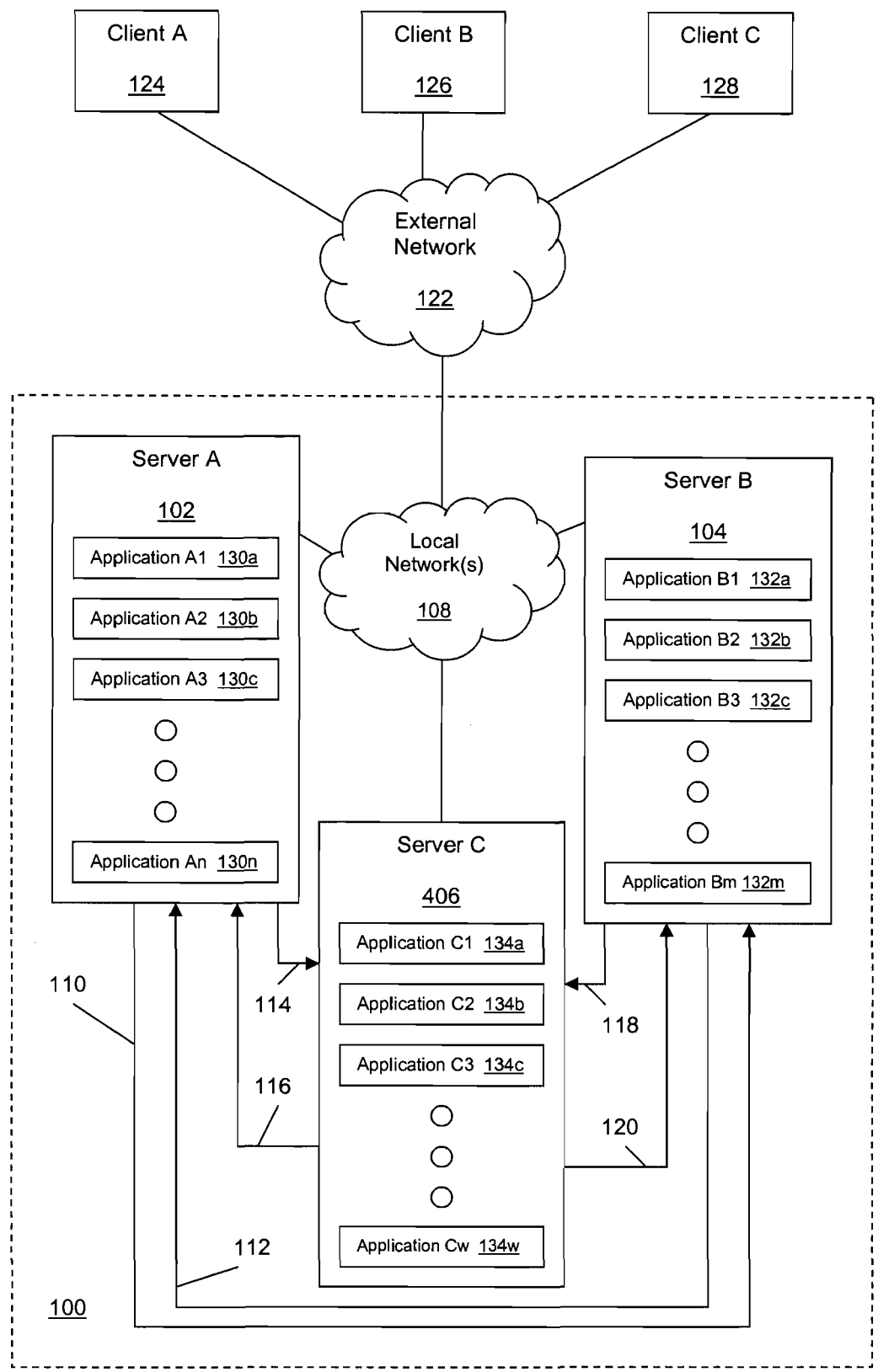
FIG. 1 is a schematic representation of a first exemplary computer cluster in respect of which aspects of the present invention may be implemented.

Referring now to FIG. 1, an exemplary computer cluster arrangement 100 is shown. The computer cluster 100 comprises three servers, namely Server A 102, Server B 104, and Server C 106. The servers 102, 104 and 106 may be zSeries or pSeries servers, for example. In the exemplary embodiment shown in FIG. 1, each server within the computer cluster 100 constitutes a single node. Accordingly, the servers 102, 104 and 106 are also referred to as nodes 102, 104 and 106. While the computers within a cluster are typically servers, this is not necessarily the case. In addition, while FIG. 1 shows the computer cluster 100 as comprising three nodes 102, 104, 106, this is for illustrative purposes only, and a cluster in respect of which aspects of the present invention may be applied may comprise one node, two nodes, three nodes as shown in FIG. 1, or more than three nodes. In addition, as will be described in more detail in respect of FIG. 2, a single computer may be configured with software which logically divides a single processor into two or more virtual processors, each of which may be considered to be a single node for the purpose of aspects of the present invention. Accordingly, a single computer with a single processor may host either a single node or more than one node, and a single computer having multiple processors may host a single node, a number of nodes equal to the number of its processors, or that computer may host more nodes than it has processors.

The nodes 102, 104 and 106 are coupled to one another, and to other resources (not shown) used by the computer cluster, through one or more local networks 108. In some embodiments, the one or more local networks 108 may comprise two or more partially or completely redundant local networks 108 so that the computer cluster 100 can continue to function in the event of a failure of one or more network components. In some embodiments, the one or more local networks 108 may comprise one or more virtual networks supported by the same physical processors which define the nodes in the cluster, so that the one or more local networks 108 may be entirely virtual. In such embodiments, an external network such as external network 122 (described below) may be coupled to the computer cluster by connection, via one or more network adaptors, to one or more servers within the computer cluster.

While reference is made herein to "local" networks, this should not be taken as implying a limitation that the nodes within a cluster, or more particularly the computers hosting those nodes, must be physically close together. Rather, the term "local" refers to the fact that the network couples the nodes to one another within the computer cluster. In practice, some of the physical computers within a computer cluster may be miles away from other physical computers within the computer cluster.

In addition to the one or more local networks 108, in the exemplary computer cluster 100 shown in FIG. 1 the nodes 102, 104 and 106 communicate with one another directly through private network connections 110 through 118. Private network connections 110 through 118 may be, for example, heartbeat network connections which enable each node 102, 104, 106 in the cluster 100 to monitor the health and status of each other node 102, 104, 106 in the cluster 100. More particularly, private network connection 110 enables node 104 (Server B) to monitor node 102 (Server A) and private network connection 112 enables node 102 (Server A) to monitor node 104 (Server B), private network connection 114 enables node 106 (Server C) to monitor node 102 (Server A) and private network connection 116 enables node 102 (Server A) to monitor node 106 (Server C), and private network connection 118 enables node 106 (Server C) to monitor node 104 (Server B) and private network connection 120 enables node 104 (Server B) to monitor node 106 (Server C). Other types of computer clusters, such as mainframe-based computer clusters, may not include private network connections such as private network connections 110 through 118.

The computer cluster 100 communicates with one or more external networks 122, typically through a firewall arrangement (not shown). The one or more external networks 122 are "external" in the sense of being external to the computer cluster 100, and may include the Internet, and may also include an organization's internal network or networks. The external network 122 may be, for example, a TCP/IP network. Various client computers, such as Client A 124, Client B 126 and Client C 128 are coupled to the one or more external networks 122, and can access services provided by the computer cluster 100 by communicating with the one or more external networks 122 which in turn communicate with the one or more local networks 108. As noted above, in some embodiments, an external network such as external network 122 may be coupled by a network adaptor directly to one or more of the servers, such as server 102, 104 or 106, thereby enabling communication between the external network 122 and the local network 108.

Within the computer cluster 100, a plurality of applications can be activated for each node 102, 104, 106 in the computer cluster 100. Server A (node 102) has n applications, represented as Applications A1 to An (130a to 130n, respectively), Server B (node 104) has m applications, represented as Applications B1 to Bm (132a to 132m, respectively) and Server C (node 106) has w applications, represented as Applications C1 to Cw (134a to 134w, respectively) with n, m and w being whole numbers. The whole numbers n, m and w may be different from one another or identical to one another or two numbers may be identical to one another with the third being different.

Applications A1 to An (130a to 130n, respectively), B1 to Bm (132a to 132m, respectively) and C1 to Cw (134a to 134w, respectively) may be any applications, including but not limited to word processing applications, web browsing applications, spreadsheet applications, statistical analysis applications, industrial or manufacturing process management applications, electronic commerce applications, communication applications, graphical applications, gaming applications, database applications and computer-aided design applications. Moreover, a particular type of computer software may be able to run on more than one node, and is considered to be a separate and distinct application for each node on which it can be run. For example, Application A1 130a may be an instantiation of a particular electronic commerce program, and Application B2 132b may be another instantiation of the same electronic commerce program; Applications A1 130a and B2 132b are nonetheless considered to be separate and distinct applications because they run on different nodes. This is the case whether a single instance of the computer code for the computer software is stored in a single storage accessible to both nodes, or in two separate storage units, one accessible by each node (and inaccessible by the other node).

Figure 2:
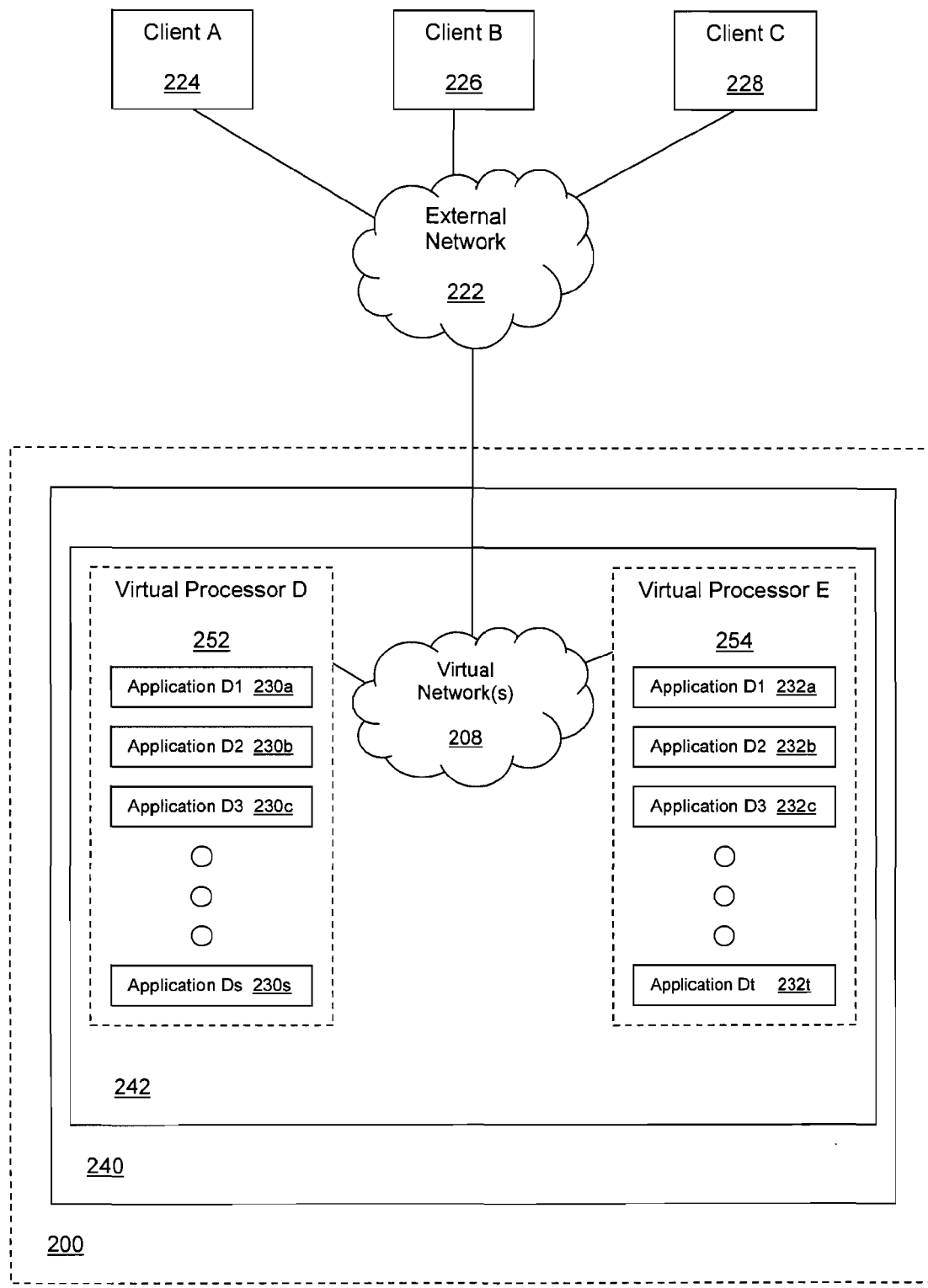
FIG. 2 is a schematic representation of a second exemplary computer cluster in respect of which aspects of the present invention may be implemented.

With reference now to FIG. 2, another exemplary embodiment of a computer cluster is shown generally at 200. In this embodiment, the computer cluster 200 comprises a single computer 240 having a single processor 242 that is configured with software enabling that single processor 242 to function as two virtual processors, namely Virtual Processor D 252 and Virtual Processor E 254. Accordingly, within the exemplary computer cluster 200 defined by the single computer 240, each virtual processor 252, 254 is a distinct node.

While FIG. 2 depicts the cluster 200 as comprising two nodes 252, 254 defined by the two virtual processors 252, an arrangement wherein virtual processors within a single processor act as distinct nodes may define one node, two nodes as shown in FIG. 2, three nodes or more than three nodes for that single processor. A computer cluster may be an arrangement comprising a plurality of computers such as computer 240, each having a single processor such as processor 242 that is configured to operate as more than one node.

In the cluster arrangement 200, the virtual processors 252, 254 are coupled to one another, and to other resources (not shown) used by the cluster, through one or more virtual networks 208. The computer cluster 200 communicates with one or more external networks 222, typically through a firewall arrangement (not shown) by way of one or more network adaptors (not shown) coupling the one or more external networks 222 to the computer 240. Similarly to the cluster arrangement 100 in FIG. 1, client computers, such as Client A 224, Client B 226 and Client C 228 are coupled to the one or more external networks 222. These client computers 224, 226 and 228 can access services provided by the computer cluster 200 by communicating with the one or more external network 222 which in turn communicates with computer 240.

Analogously to the computer cluster 100 shown in FIG. 1, a plurality of applications can be activated for each node 252, 254 in the cluster 200. Virtual Processor D (node 252) has s applications, represented as Applications D1 to Ds (230a to 230s, respectively), and Virtual Processor E (node 254) has t applications, represented as Applications E1 to Et (232a to 232t, respectively) with s and t being whole numbers. The whole numbers s and t may be different from one another or identical to one another.

As was the case for the applications associated with the computer cluster 100 in FIG. 1, Applications D1 to Ds (230a to 230s, respectively) and E1 to Et (232a to 232t, respectively) may be any applications, including but not limited to word processing applications, web browsing applications, spreadsheet applications, statistical analysis applications, industrial or manufacturing process management applications, electronic commerce applications, communication applications, graphical applications, gaming applications, database applications and computer-aided design applications. Moreover, as was the case for the applications associated with the computer cluster 100 in FIG. 1, a particular type of computer software may be able to run on more than one node, and is considered to be a separate and distinct application for each node on which it can be run, whether a single instance of the computer code for the computer software is stored in a single storage accessible to both nodes, or in two separate storage units, one accessible by each node.

FIGS. 1 and 2 are schematic depictions of the exemplary computer clusters 100, 200 and accordingly applications that are available for a particular node within the computer cluster 200 are depicted as boxes within a larger box representing that node. However, for an application to be available for a particular node, it is not necessary that that application must actually be stored in that node; all that is required is that the node be able to run that application. For example, the computer code for the application may reside on permanent storage (such as a hard drive) within the node, or may reside on external storage that can be accessed by the node (which would be the case for computers that do not have their own hard drive, such as zSeries servers). In a mainframe context, the individual mainframe computers typically do not have their own hard drives, and the mainframe computers will access one or more separate hard drives through the use of disk controllers. Frequently, a single hard disk partition from which nodes will load applications is accessed by multiple systems within a cluster.

With reference now to both FIG. 1 and FIG. 2, a computer cluster arrangement may comprise some computers which function as a single node, such as servers 102, 104, 106 in FIG. 1, and other computers such as computer 240 that each have a single processor such as processing unit 242 that is configured to operate as more than one node. A computer cluster may also include computers which have multiple processors, where each processor operates either as a single node or as a plurality of virtual nodes. Accordingly, a computer cluster in respect of which aspects of the present invention may be implemented may generally comprise any combination of single processor and multiple processor computers, each of whose processors may operate as either a single node or as more than one node. While aspects of the present invention may be applied in respect of computer clusters consisting of a single computer hosting a single node, and in respect of a single computer hosting multiple nodes, it is to be appreciated that aspects of the present invention have particular advantages when applied in respect of a computer cluster comprising a plurality of nodes hosted by a plurality of physical computers. For example, aspects of the present invention may be advantageously applied to a computer cluster comprising nodes that are hosted by a plurality of physical computers which are located in a plurality of physical machine rooms.

Figure 3:
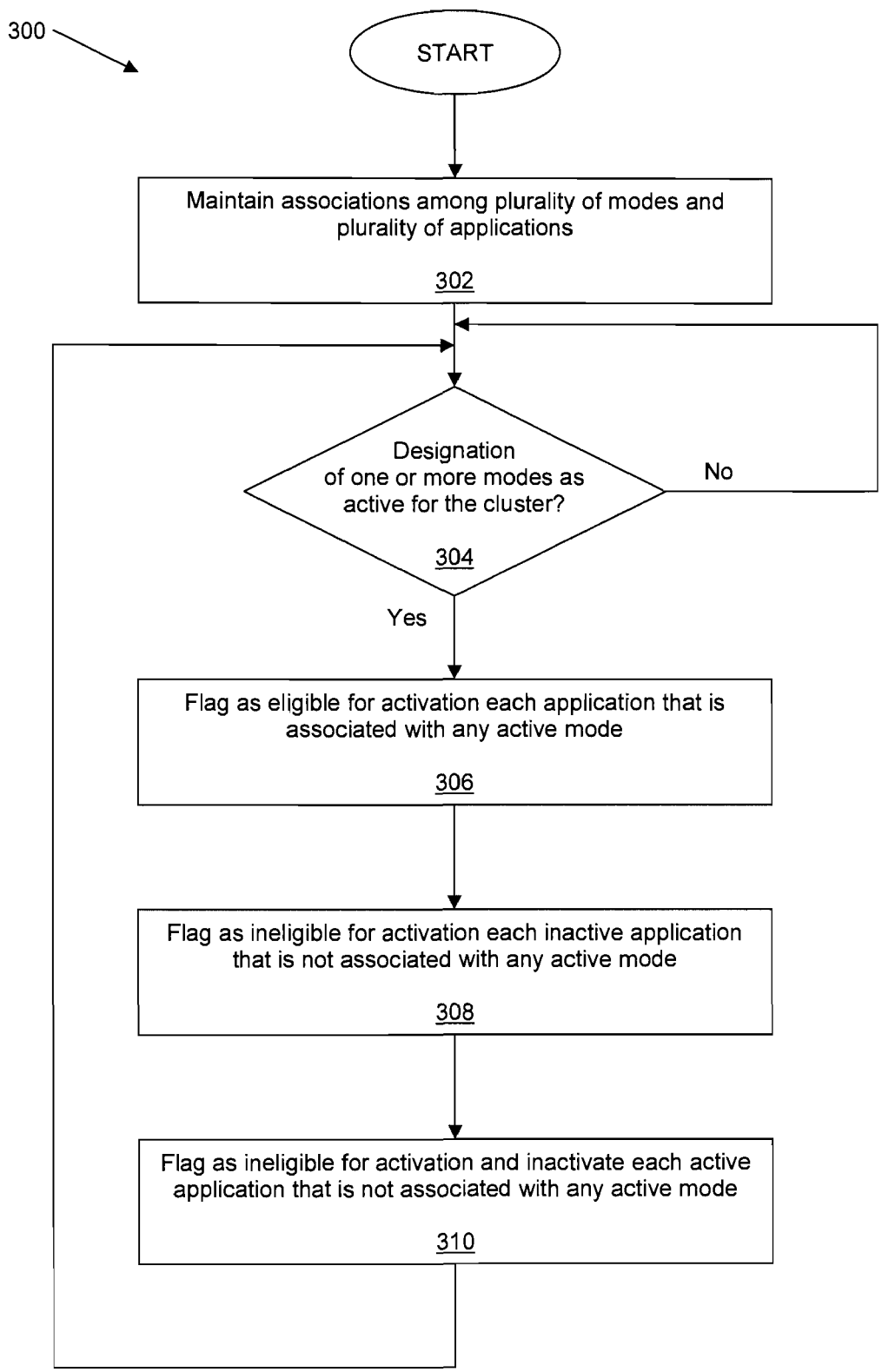
FIG. 3 is a flow chart depicting a first method for managing a plurality of applications in a computer cluster according to an aspect of the present invention.

With reference now to FIG. 3, according to an aspect of the present invention, a method 300 for managing a plurality of applications in a computer cluster is shown. As noted above, each application is available for a particular node in the cluster, and where a particular computer program is available for more than one node in the cluster, each instance of availability is considered to be a separate application.

At Step 302, the method 300 maintains associations among a plurality of modes and a plurality of applications, with each application being associated with at least one mode. Each mode within the plurality of modes represents a workload profile of the computer cluster, wherein for each particular node, certain applications are eligible for activation and others are ineligible for activation. The workload profile represented by each mode, and each combination of modes, is predetermined. In certain circumstances, it may be desirable to have certain modes be active simultaneously in the computer cluster. For example, the "ALL" mode (described in more detail below) may be active simultaneously with another mode. In other circumstances or for other modes, only one mode should be active at any given time.

Certain "standard" modes may be provided directly by software for managing computer clusters (i.e. such modes are predefined by the organization that creates the software for managing computer clusters), and there may also be "user-defined" modes created by an organization that maintains or uses a particular computer cluster. Accordingly, an organization that maintains or uses a computer cluster can define modes that represent workload profiles of that computer cluster that are each intended for use in a particular situation, and according to an aspect of the present invention the mode of the computer cluster can be changed to adapt the computer cluster to a particular situation. For example, a first mode could be used when a computer cluster is performing a primary function of managing and maintaining a stable electronic commerce arrangement, and a second mode could be used where substantial changes are being made to the electronic commerce arrangement (such as updating a catalogue). Particular exemplary embodiments of modes which may be used in accordance with aspects of the present invention are described in greater detail below.

As noted above, each application within the plurality of applications to which the method 300 is applied is associated with at least one mode. Thus, with reference to the exemplary computer cluster 100 shown in FIG. 1, Application A1 130a would be associated with one or more modes, Application A2 130b would be associated with one or more modes, and so on to Application An 130n. Similarly, Application B1 132a would be associated with one or more modes, Application B2 132b would be associated with one or more modes, and so on to Application Bm 132m, and Application C1 134a would be associated with one or more modes, Application C2 134b would be associated with one or more modes, and so on to Application Cw 134w. With reference to the exemplary computer cluster 200 in FIG. 2, Application D1 230a would be associated with one or more modes, Application D2 230b would be associated with one or more modes, and so on to Application Ds 230s, and Application E1 232a would be associated with one or more modes, Application E2 232b would be associated with one or more modes, and so on to Application Et 232t. An application would be associated with only one mode if it should only be eligible for activation on its respective node when that mode is active for the computer cluster; an application would be associated with more than one mode if there is more than one mode in which that application should be eligible for activation on its respective node.

One or more applications may be associated with identical sets of modes (e.g. if those applications have a dependency relationship and should operate together, such that one should not be active unless the other is active). It should also be noted that the computer cluster may include applications that do not have any modes associated therewith; any such applications are not included in the plurality of applications to which the method 300 is applied. Stated differently, the plurality of applications to which the method 300 is applied is not necessarily all applications that can run in the computer cluster, but only those applications associated with at least one mode. Management of applications that do not have any modes associated therewith can be accomplished by other techniques (for example manually).

Continuing the explanation of the method 300 depicted in FIG. 3, at step 304 the method 300 checks whether there has been a designation of one or more modes as active for the cluster. Designation of one or more modes as active may be a result of an automated process carried out by software managing the computer cluster, or such a designation may result from user input, i.e. a manual selection of one or more modes by a user of the software managing the computer cluster. Moreover, the designation of one or more modes detected at step 304 may be an initial designation (such as at startup of the computer cluster), or may be a change in an existing designation of one or more modes. Thus, any newly designated mode or modes will be active for the cluster, and any previously designated mode or modes will become inactive (unless that previous mode or modes is also included in the new designation).

Responsive to designation of at least one mode as active for the cluster (detected at step 304), at step 306 the method 300 flags as eligible for activation each application that is associated with any active mode. This includes applications that are already active and are associated with an active mode, and also applications that are inactive and are associated with an active mode. Also responsive to designation of at least one mode as active for the cluster, at step 308, the method 300 flags as ineligible for activation each application that is inactive and is not associated with any active mode, and at step 310 the method 300 flags as ineligible for activation and inactivates each application that is active and is not associated with any active mode. Thus, where an active application is not associated with a currently active mode, it will not only be flagged as ineligible for activation, but will also be inactivated, whereas an inactive application that is not associated with an active mode will only be flagged as ineligible for activation, since that application is already inactive. As indicated above, steps 306, 308 and 310 are all performed responsive to designating at least one mode as active for the cluster (detected at step 304), and may be performed in any order, including in parallel or substantially in parallel, without departing from the scope of the present invention. The sequence in which the inactivating operations (step 310) as well as any activating operations (not shown in FIG. 3) are carried out takes into account any dependencies among applications (for example, there may be instances where a first application must be inactivated before a second application is inactivated), and known techniques for dependency management may be used for this purpose.

After completing the flagging (steps 306, 308 and 310) and inactivating (step 310) operations, the method 300 returns to step 304 to monitor for a new designation (i.e. wait for a new designation). In practice, a method according to an aspect of the present invention could be structured so that another mode designation could be made and detected while activation and deactivation processes resulting from an earlier mode designation are still ongoing. In other words, although the flagging directs the activation and inactivation processes, once the flagging has been completed, a new mode can be designated even while there is still activation and inactivation in progress.

As noted above, the method 300 shown in FIG. 3 provides for maintaining associations between individual applications and one or more modes. According to an aspect of the present invention, it is possible to further maintain associations between application groups and one or more modes. A user can define one or more application groups, with each group comprising one or more applications in the plurality of applications to which the method 300 is applied, and can associate any such defined application groups with one or more modes. (The ability to define an application group consisting of a single application may be advantageous in certain contexts, as will be discussed in more detail below.) Each application within an application group may also have its own individual association with one or more modes, in addition to the group association. In one embodiment, when a mode with which an application group is associated is designated as active, then the applications within that application group will not be affected by their membership in that group. Thus, in accordance with the flagging at steps 306, 308 and 310 of the method 300, each application that is a member of a group associated with a currently active mode will be either eligible or ineligible for activation on the basis of whether that application is individually associated with a currently active mode. In the above-described embodiment, if an application group is not associated with any active mode, then any applications that are members of that application group are ineligible for activation regardless of whether their individual mode associations would otherwise cause them to be flagged as eligible for activation. It should be noted here that "on-demand" applications (discussed in more detail below) would always be able to be activated when required, even if an on-demand application was included in an application group that was not associated with any currently active mode.

Figure 4:
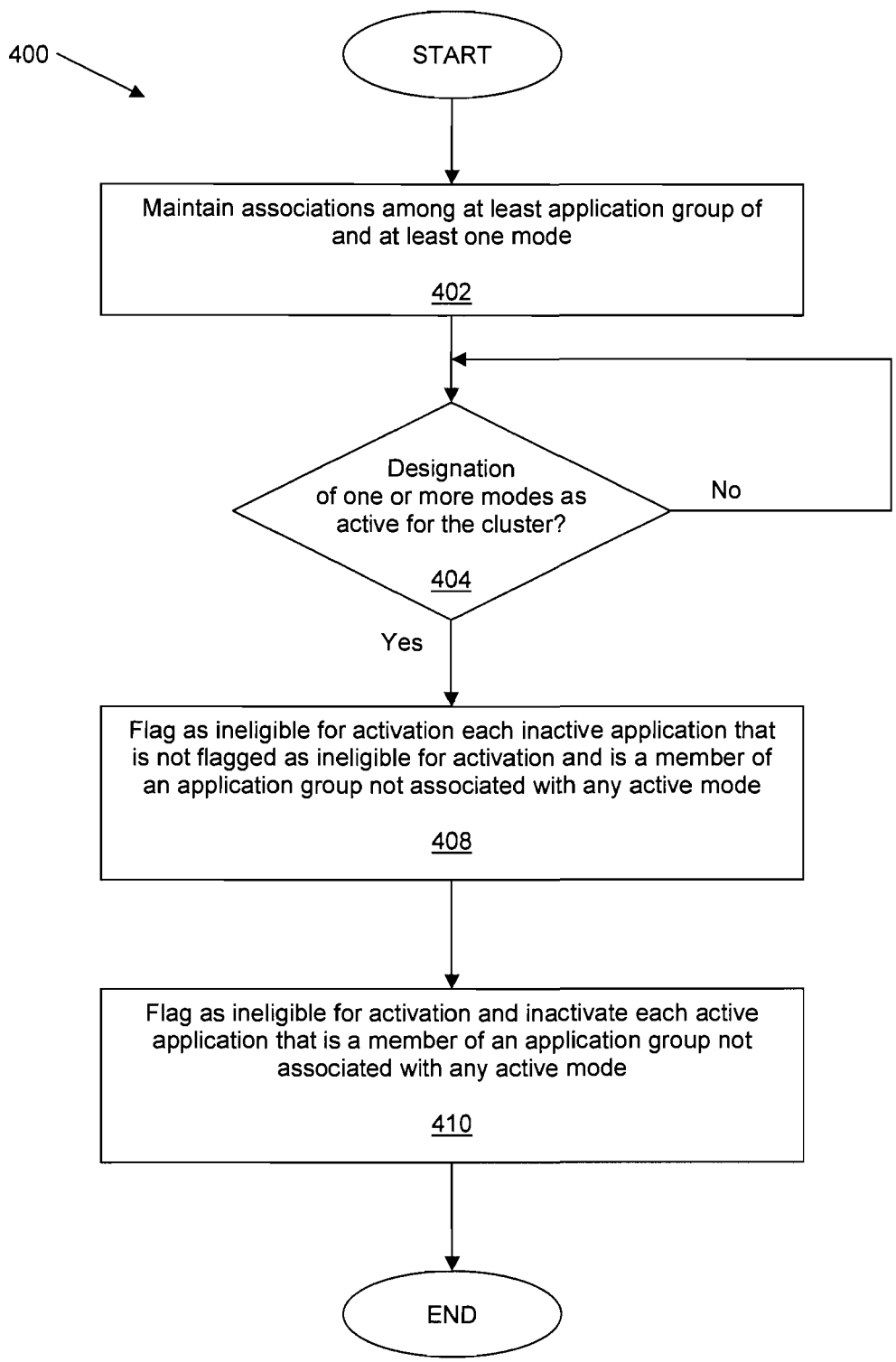
FIG. 4 is a flow chart depicting a first method for managing one or more application groups in a computer cluster according to an aspect of the present invention.

With reference now to FIG. 4, a method for managing one or more application groups in a computer cluster is shown generally at 400. The method 400 may be applied following completion of the method 300 shown in FIG. 3. More particularly, the method 400 may be applied immediately following step 310 of the method 300, before the method 300 returns to step 302. One skilled in the art will appreciate that in such an embodiment, step 404 of the method 400 may be integrated with or subsumed by step 304 of the method 300, and step 402 may be performed simultaneously with step 302 of the method 300.

At step 402, the method 400 maintains associations among at least one application group within the plurality of applications and at least one mode in the plurality of modes, so that each such application group is associated with at least one mode. At step 404, the method 400 checks whether there has been a designation of one or more modes as active for the computer cluster. If there has been no designation (i.e. no further designation since the current mode or modes were designated as active), then the method 400 continues to wait for a new designation. If the method 400 detects a designation of one or more modes as active for the computer cluster, then the method 400 proceeds to step 408. At step 408, the method 400 flags as ineligible for activation each application that is inactive, is not flagged as ineligible for activation and is a member of an application group that is not associated with any active mode, even if that application is individually associated with an active mode. At step 410, the method 400 flags as ineligible for activation and inactivates each application that is active and is a member of an application group that is not associated with any active mode, even if that application is individually associated with an active mode. After step 410, the method 400 ends and, where the method 400 is performed following step 310 of the method 300 in FIG. 3, returns to step 302 of the method 300 in FIG. 3.

Steps 408 and 410 may be implemented in any order, including in parallel or substantially in parallel, and the inactivating at step 410 is sequenced according to dependencies among the applications.

It will be noted that the method 400 does not include a step corresponding to step 306 of the method 300 in FIG. 3; that is, the method 400 does not flag any applications as eligible for activation. Because the method 300 in FIG. 3 is executed before the method 400 in FIG. 4, any applications that, based on their individual mode associations, are eligible for activation under the newly designated mode or modes will have already been flagged as such at step 306 of FIG. 3. Similarly, any applications that, based on their individual mode associations, are ineligible for activation under the newly designated mode or mode will have been flagged as ineligible at step 308 in FIG. 3 or flagged and inactivated at step 310 in FIG. 3. Thus, according to the method 400, no action needs to be taken in respect of applications that are members of groups associated with one or more active modes, so the eligibility of those applications for activation will be governed by the flags applied at steps 306, 308 and 310 of the method 300. For applications that are members of application groups that are not associated with any active mode, any such applications that were not flagged as ineligible for activation at steps 308 and 310 of the method 300, including applications that were initially flagged as eligible for activation at step 306 based on their individual mode associations, will be flagged as ineligible for activation (and if necessary, inactivated) at steps 408 and 410 of the method 400. No action needs to be taken in respect of applications that are not members of any application group associated with an active mode and which were, based on their individual associations, already flagged as ineligible at step 308 in FIG. 3 or flagged and inactivated at step 310 in FIG. 3 (although such applications may be re-flagged by an equivalent embodiment of the method 400 without departing from the scope of the present invention). No action is taken by the method 400 for applications that are not members of any application group, and the eligibility for activation of these applications continues to be governed by their individual associations with particular modes.

Figure 5:
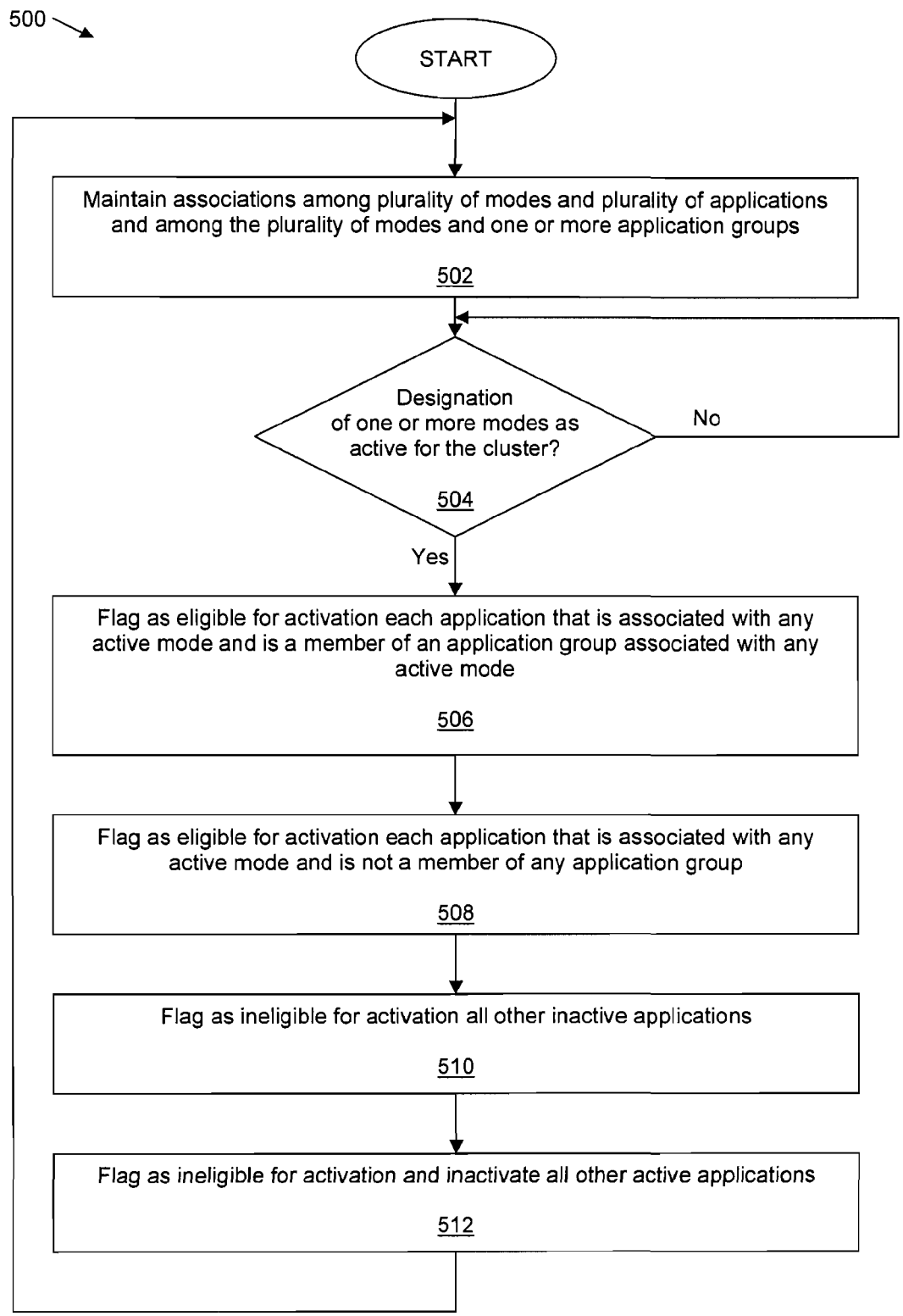
FIG. 5 is a flow chart depicting a second method for managing a plurality of applications in a computer cluster according to an aspect of the present invention.

With reference now to FIG. 5, a method for managing a plurality of applications in a computer cluster according to an aspect of the present invention is shown generally at 500. The method 500 integrates the methods 300 and 400 shown in FIGS. 3 and 4, respectively. This integration is based on the recognition that the cumulative effect of applying the method 400 following application of the method 300 is that only two types of applications will be eligible for activation, namely applications that are individually associated with at least one active mode and are not a member of any application group, and applications which are both individually associated with an active mode and are also members of an application group that is associated with an active mode.

At step 502, the method 500 maintains associations among the plurality of modes and the plurality of applications, and further maintains associations among the plurality of modes and one or more application groups. At step 504, the method 500 checks whether there has been a designation of one or more modes as active for the cluster. If there has been no designation (i.e. no further designation since the current mode or modes were designated as active), then the method 500 returns to step 504 to continue monitoring for a new designation. If the method 500 detects a designation of one or more modes as active for the cluster, then the method 500 proceeds to step 506.

At step 506, the method 500 flags as eligible for activation each application that is both individually associated with at least one active mode and is also a member of an application group that is associated with at least one active mode. The applications affected by step 506 are those which, because they are members of an application group associated with an active mode, will be governed by their individual associations, and whose individual associations make them eligible for activation.

At step 508, the method 500 flags as eligible for activation each application that is individually associated with at least one active mode and is not a member of any application group. Step 508 affects those applications which are eligible for activation based on their individual mode associations and are not a member of any application group and are therefore unaffected by any group mode associations.

At step 510, the method 500 flags as ineligible for activation all other inactive applications, that is, all inactive applications that were not, or will not be, flagged at either step 506 or 508. These include inactive applications which would be eligible for activation based on their individual associations (i.e. they are associated with an active mode) but which are members of an application group that is not associated with any active mode, inactive applications that are ineligible for activation based both on their individual associations (i.e. not associated with any active mode) and also on their group membership (i.e. they are members of an application group that is not associated with any active mode), and inactive applications that are ineligible for activation based on their individual associations (i.e. not associated with any active mode) and which are not members of any application group.

Similarly, at step 512, the method 500 flags as ineligible for activation and inactivates all other active applications, that is, all active applications that were not, or will not be, flagged at either step 506 or 508. These include active applications which would be eligible for activation based on their individual associations (i.e. they are associated with an active mode) but which are members of an application group that is not associated with any active mode, active applications that are ineligible for activation based both on their individual associations (i.e. not associated with any active mode) and also on their group membership (i.e. they are members of an application group that is not associated with any active mode), and active applications that are ineligible for activation based on their individual associations (i.e. not associated with any active mode) and which are not members of any application group.

Steps 506 through 512 may be carried out in any order, including in parallel or substantially in parallel, as long as no step reverses any action taken by any earlier step. In addition, the inactivating at step 512 is sequenced according to dependencies among the applications.

In an alternative embodiment of aspects of the present invention, treatment of application groups may be such that where a mode with which an application group is associated is designated as active, all applications that are members of that group become eligible for activation regardless of their individual associations and are flagged as such. In one version of such an embodiment, when an application group is not associated with any active mode, all applications that are members of that application group are treated in accordance with their individual associations. In order to implement this version of the embodiment, it is merely necessary to apply an additional step (not shown), after completion of steps 306, 308 and 310 of the method 300, of flagging as eligible for activation each application that is not already flagged as eligible for activation and that is a member of an application group that is associated with any active mode. Optionally, applications that are members of a group associated with any active mode and that were already flagged as eligible for application at step 306 of the method 300 can be re-flagged. The effect of the additional flagging step is to override the flagging of any individual applications that were individually ineligible for activation but are eligible for activation by reason of their membership in an application group that is associated with at least one active mode.

In an alternative version of an embodiment in which all applications that are members of an application group associated with an active node become eligible for activation regardless of their individual mode associations, when an application group is not associated with any active mode, all applications that are members of that application group, other than on-demand applications (discussed in more detail below), are ineligible for activation regardless of their individual mode associations. Thus, while applications in such an embodiment may have individual associations with one or more modes, where particular applications are members of one or more groups, their eligibility is determined solely by their group membership.

Figure 6:
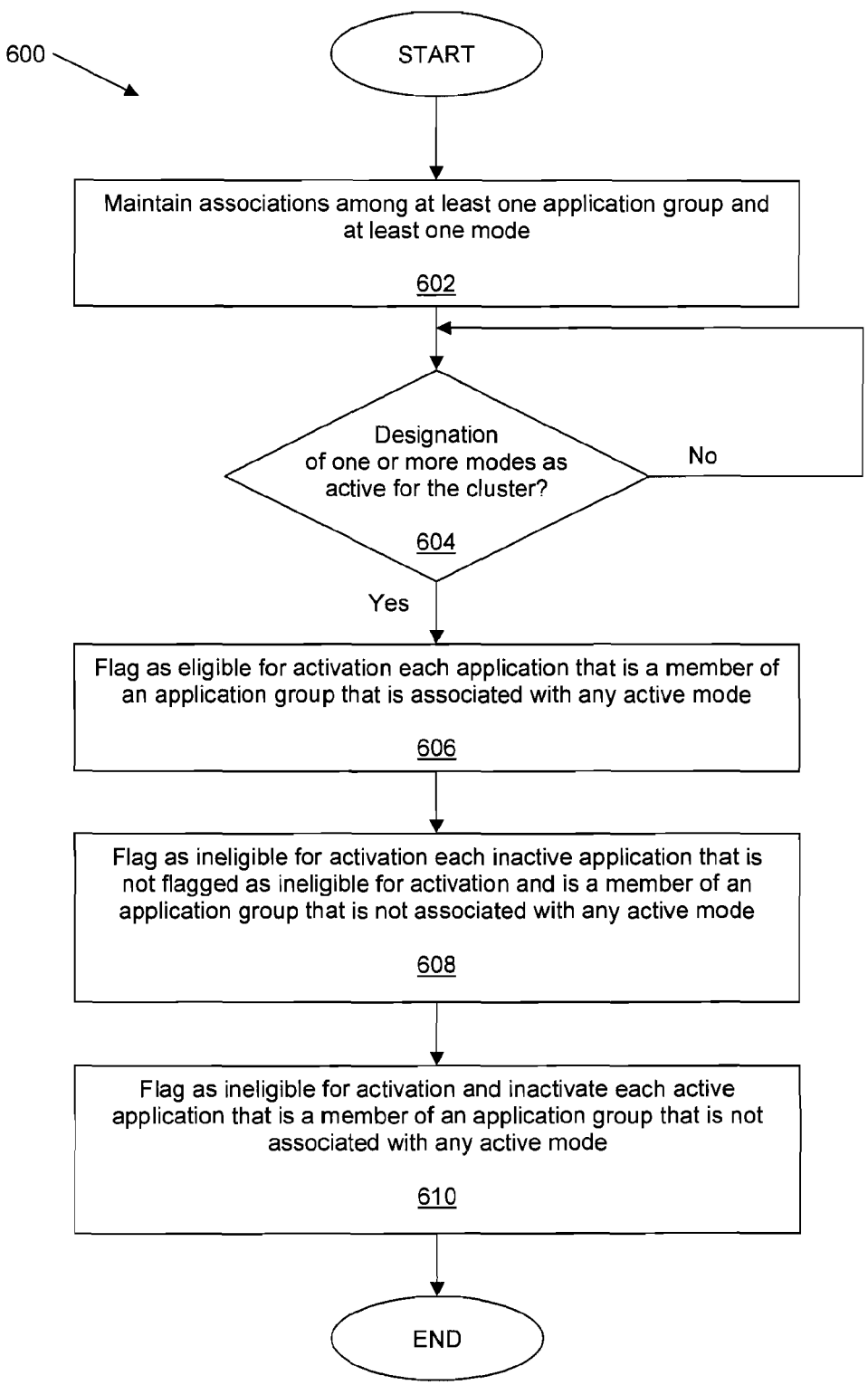
FIG. 6 is a flow chart depicting a second method for managing one or more application groups in a computer cluster according to an aspect of the present invention.

With reference now to FIG. 6, a method for managing a plurality of applications in a computer cluster, with each application being eligible to run on a particular node in the cluster, is shown generally at 600. According to the method 600, where particular applications are members of one or more application groups, their eligibility is determined solely by their group membership.

At step 602, the method 600 maintains associations among a plurality of application groups within the plurality of applications and a plurality of modes, so that each application group is associated with at least one mode. At step 604, the method 600 checks whether there has been a designation of one or more modes as active for the computer cluster. If there has been no designation (i.e. no further designation since the current mode or modes were designated as active), then the method 600 continues to wait for a new designation. If the method 600 detects a designation of one or more modes as active for the cluster, then the method 600 proceeds to step 606.

At step 606, the method 600 flags as eligible for activation each application that is a member of an application group that is associated with any active mode. At step 608, the method 600 flags as ineligible for activation each application that is inactive, is not flagged as ineligible for activation and is a member of an application group that is not associated with any active mode. At step 610, the method 600 flags as ineligible for activation and inactivates each application that is active and is a member of an application group that is not associated with any active mode. After step 610, the method 400 ends. Steps 606, 608 and 610 can be performed in any order, including in parallel or substantially in parallel.

The method 600 can be applied so that eligibility based on group membership overrides eligibility based on individual associations. In such embodiments, the method 600 may be applied immediately after step 310 of the method 300, or steps 606 to 610 can be applied immediately after step 310 of the method 300, with step 604 being subsumed into step 304 of the method 300, and step 602 being performed substantially in parallel with step 302 of the method 300. The result will be that any flags applied to applications by the method 300 (on the basis of individual associations with modes) that conflict with an application's group membership will be overridden by the method 600.

Alternatively, the method 600 can be applied where applications do not have any individual associations with modes, but are members of application groups which have such associations. Thus, such an embodiment can be used where applications are to be managed entirely by means of group membership. In such circumstances, the method 600 would be applied alone, without any application of the method 300.

In the further alternative, the method 600 can also be applied in circumstances where applications are intended to have either individual associations with modes, or associations with modes by reason of group membership, but not both. In such an embodiment, applications that are intended to have individual associations with modes can be defined as being the sole member of an application group having the relevant association(s). The result will be that application of the method 600 to each such group of one application will have the same effect as if the application's eligibility for activation were handled according to an equivalent individual association.

Optionally, a user could be provided with an ability to choose between various options for handling of group behavior.

Preferably, an individual application will be a member of only a single application group, in order to make the behavior of the computer cluster more predictable. If a given application is a member of more than one application group, there is a risk that such an application could be subject to conflicting eligibility designations, such as where its membership in one application group associated with an active mode would render it eligible for activation, while its membership in another application group not associated with any active node would render it ineligible for activation. However, so long as care is taken to avoid such conflicts, so that the membership of applications in application groups and association of application groups with modes are coordinated so as to be non-conflicting, an application may be made a member of more than one application group.

In addition, the aspects of the present invention directed toward management of groups of applications may be advantageously applied to facilitate the management of groups of application groups. For example, an application group may be defined which comprises an overall group of smaller application groups, each with its own mode associations, or may be a group consisting of one or more smaller application groups and one or more individual applications, each with their own mode associations. The aspects of the present invention herein described may, with suitable modification, be applied to such nested groups without departing from the scope of the present invention.

By default, the computer cluster will activate all of the applications that were flagged in any of the methods 300, 400, 500 or 600 as eligible for activation; this will usually be done immediately or almost immediately following flagging of those applications as eligible for activation, or substantially simultaneously with the flagging, and this activation will also take account of dependencies among the applications, for which purpose known dependency management techniques can be used. However, there may be some instances in which it is preferred not to immediately activate those applications, or to immediately activate only some of those applications, while leaving others inactive but eligible for activation. Specific instructions can be provided to the computer cluster as to which applications are to be activated immediately upon becoming eligible for activation, and as to the circumstances in which other applications will be activated after becoming eligible. Optionally, in some circumstances applications that are flagged as eligible for activation can be activated manually. In an embodiment in which all applications that are eligible for activation are automatically activated without a separate flagging step, such activation is equivalent to flagging because the flagging as eligible for activation is inherently subsumed by the activation itself. In other words, in such a context the act of activating an application inherently flags that application as eligible for activation. Preferably, however, applications are not started automatically simply because they are flagged as eligible for activation, but must also be subject to a request for activation, in addition to being eligible for activation.

In contrast, active applications that become ineligible for activation because of a mode change (other than on-demand applications, which are described in more detail below) are automatically inactivated. Such a step of flagging as ineligible for activation and inactivating certain applications, such as at steps 310, 410, 512 and 610, may not necessarily be performed as two distinct, consecutive actions. Rather, such applications will typically first be flagged for inactivation (which flagging may inherently also constitute a flagging as ineligible for activation, or may be a separate flagging) and only later be inactivated. Flagging an application for later inactivation, rather than immediately inactivating that application, is advantageous because it facilitates dependency management. While an embodiment in which applications are inactivated without first being flagged therefor could be implemented, handling of the next application affected by the mode designation could not proceed until all dependencies associated with inactivation of the current application had been dealt with. In some embodiments, flagging as ineligible for activation may be subsumed into the inactivation. Moreover, the process of activating eligible applications and inactivating ineligible applications may in practice take several minutes and may require many status updates and new orders to complete, depending on the particular computer cluster. During this time, in some embodiments the software implementing a method according to an aspect of the present invention may be waiting for further mode designations, and will change the flagging if a new designation is made. Such a change of the flagging would redirect the activation and inactivation processes.

In one embodiment, the plurality of modes includes a mode which is always active. This mode is referred to herein as the "ALL" mode; it will be appreciated that the word "ALL" is merely a label, and that other names besides "ALL" may be used to denote an identical or substantially similar mode without departing from the scope of the present invention. Because the ALL mode is always active, applications which are associated with the ALL mode will, according to step 306, steps 506 and 508, or step 606 of the methods 300, 500 or 600, respectively, always be flagged as eligible for activation, even if those applications are also associated with other modes. Typically, these applications will always be active, although there may be some instances in which some such applications should be inactive but eligible for activation. Accordingly, applications which should always be active, or which should always be eligible for activation, should be associated with the ALL mode. Examples of applications which may advantageously be associated with the ALL mode for the nodes on which instances thereof will run include, in the z/OS context, Job Entry Subsystem (JES), Library Look Aside (LLA), Virtual Lookup Facility (VLF), Virtual Telecommunication Access Method (VTAM), TeleCommunication Protocol/Internet Protocol (TCP/IP), Time Sharing Option (TSO), NetView and Automation. JES, LLA and VLF provide basic services to assist the operating system. VTAM and TCP/IP provide network access. TSO lets users perform a basic log in, and NetView and Automation facilitate the automation of the cluster; if either of these latter two applications is deactivated a human operator generally must restart the applications.

Advantageously, according to an aspect of the present invention, in one embodiment the plurality of modes includes an "on-demand" mode, and applications that are associated with the "on-demand" mode are designated as "on-demand" applications; it will be appreciated that the term "on-demand" is merely a label, and that other names besides "on-demand" may be used to denote an identical or substantially similar mode and associated applications without departing from the scope of the present invention. In this embodiment, the on-demand mode is considered by the computer cluster to always be active (note that the on-demand mode is to be distinguished from the "ALL" mode, which is also always active), and on-demand applications are activated when required by the node with which they are associated and inactivated when no longer required, independent of any other mode or modes (i.e. other than the on-demand mode) designated as active for the computer cluster as a whole. Thus, in one embodiment on-demand applications would be activated and inactivated as required, regardless of the flags applied at steps 306 to 310, steps 406 to 410, steps 506 to 512 or steps 606 to 610 of the method 300, 400, 500 or 600, respectively. Furthermore, any active on-demand applications would not be inactivated at step 310, step 410, step 512 or step 610 of the method 300, 400, 500 or 600, respectively, even if such active on-demand applications are not associated with any active mode other than the on-demand mode. In general, an on-demand resource (instantiated as one or more on-demand applications) is considered to be required when it must be active in order to support another resource (instantiated as one or more applications) that is dependent on that on-demand application. As will be apparent to one skilled in the art, now informed by the herein disclosure, request and scheduling rules may be implemented to enable software managing a computer cluster to determine whether or not a particular resource is required to be available, and these rules may be modified so that on-demand resources, or more particularly their instantiating applications, are required to be available when the resources upon which they depend are required to be available.

In an alternative embodiment, certain applications are specifically designated as on-demand applications and are not included in the plurality of applications having one or more modes associated therewith. Accordingly, in such an embodiment there is no on-demand mode, but the on-demand applications are excluded from the flagging and inactivation operations carried out at steps 306 to 310, 406 to 410, steps 506 to 512 or steps 606 to 610 of the method 300, 400, 500 or 600, respectively, because they are not included in the plurality of applications in respect of which the respective method operates.

In a further alternative embodiment, certain applications are specifically designated as on-demand applications and there is no on-demand mode. In such an embodiment, although the on-demand applications are included within the plurality of applications operated on by the methods 300, 400, 500 or 600, the methods are configured so that the on-demand designation overrides any contrary action by the methods. Thus, on-demand applications would be activated and inactivated as required, regardless of the flags applied at steps 306 to 310, steps 406 to 410, steps 506 to 512 or steps 606 to 610 of the method 300, 400, 500 or 600, respectively, and active on-demand applications would not be inactivated at step 310, 410, 512 or 610.

In one embodiment, the plurality of modes includes a DEFAULT mode that is initially assigned to new applications introduced into the cluster; it will be appreciated that the word "DEFAULT" is merely a label, and that other names besides "DEFAULT" may be used to denote an identical or substantially similar mode without departing from the scope of the present invention. Accordingly, when a user is defining a new application in the cluster management software, if the user does not explicitly set one or more modes for the new application, the new application will be associated with the DEFAULT mode. The user can later change the association so that the new application is associated with one or more other modes; thus, users are free to move applications from the DEFAULT mode into other modes or to designate other modes in addition to the DEFAULT mode. Where new applications are introduced into the cluster and are therefore only associated with the DEFAULT mode, those applications can be made available by making the DEFAULT mode active for the cluster. The DEFAULT mode may advantageously be used when migrating from an existing computer cluster arrangement that does not implement aspects of the present invention into a computer cluster arrangement that does implement aspects of the present invention. In such a migration, all applications defined for the old computer cluster arrangement may be associated with the DEFAULT mode, with the result that when the DEFAULT mode is active, a user will see the same behavior that they would have seen in the previous (non-modal) system. Also advantageously, the cluster management software will boot into the DEFAULT mode (i.e. make the DEFAULT mode, the ALL mode and the on-demand mode, if any, the only active modes) if the cluster is cold started or warm started after having been shut down. In contrast, in a hot start, the cluster management software will boot into (i.e. make active) the same mode or modes that were active when the cluster was shut down, if that mode is known. If that mode is not known, then the cluster management software will boot into the DEFAULT mode (i.e. make the DEFAULT mode, the ALL mode, and the on-demand mode if the embodiment includes an on-demand mode, the only active modes) during a hot start as well.

In one embodiment, the plurality of modes includes at least one recovery mode. Recovery modes are typically user-defined, so that they are adapted to particular scenarios in which one or more of the nodes in the computer cluster are unavailable. Such unavailability may result from a failure of a node (either hardware or software), or from a failure in the communications infrastructure that couples a node to the computer cluster. Generally speaking, making a recovery mode active for the cluster will have the effect of making available, on a surviving node or nodes, one or more applications that are equivalent to one or more applications from the unavailable node. Often, in order to accommodate the equivalent application or applications, a recovery mode will also eliminate one or more applications from the surviving node or nodes in order to free up capacity, although this will not always be the case. Typically, the applications from the unavailable node or nodes for which equivalent applications are made available on a surviving node or node represent the user's most business critical services.

According to an aspect of the present invention, for computer cluster arrangements that include two or more nodes the plurality of modes in respect of which the method 300, 400, 500 or 600 acts may advantageously include at least one recovery mode. Each recovery mode is associated with a set of nodes that are related to one another (such relationships may take a variety of forms). If a threshold number of nodes in a set of nodes become unavailable, the appropriate recovery mode associated with that set of nodes will be designated as active. The threshold number of nodes is determined in advance, and such determination may be based on a variety of factors, including the number of nodes in the set, the importance of the services normally provided by that set of nodes, and so on. Designation of the recovery mode is typically an automated process, but may in some instances be manual.

Each recovery mode has applications associated with it so that, upon becoming active, application of the method 300, 300 and 400, 500 or 600 in respect of a particular recovery mode will make one or more applications available outside of the set of nodes in which a threshold number of nodes became unavailable. More particularly, the recovery mode will make available, on another node in the cluster that is external to the set of nodes that includes the threshold number of unavailable nodes, at least one application that is equivalent to at least one corresponding application that had been available on at least one node in the threshold number of unavailable nodes. For example, if an instance of a mission-critical database program had been available on one of the nodes in the threshold number of nodes that became unavailable, designating the appropriate recovery mode as active will result in another instance of that database program becoming available on another node in the cluster that is outside the set of nodes whose members (or at least a threshold number of whose members) became unavailable. Typically, the corresponding equivalent application or applications will not only be made available, but will also be made active. An equivalent application that is made available when a recovery mode is active may be identical to the application from the set of nodes that includes the unavailable node or nodes, or may be somewhat modified therefrom (for example to adapt to the fact that it will be running on a different node). Moreover, because the methods 300, 400, 500 and 600 take account of dependencies, where an equivalent application depends on one or more other applications, any such other applications will also be made available, and those applications, together with the equivalent application, will be started in the correct order. Once the node or nodes which became unavailable become available again (e.g. the malfunction is corrected, the hardware problem is repaired or the node is repaired or replaced), then the computer cluster can be moved out of the selected recovery mode by re-designating the mode or set of modes that had been active when the node became unavailable, or by designating a different mode or set of modes.

For computer clusters that consist of a plurality of nodes hosted by a single physical computer, recovery modes may be useful in situations where one or more nodes become unavailable for reasons unrelated to hardware. For example, recovery modes may be used where a cluster consists of a single computer whose single processor is configured to operate as a plurality of virtual processors and one or more of those virtual processors become unavailable due to software problem. It is to be appreciated, however, that recovery modes may be of little utility where a cluster consists of a single computer and that computer experiences a hardware malfunction.

In an exemplary embodiment, a cluster may comprise a plurality of computers, wherein the plurality of computers is made up of two physical groups of computers operated in two physically separate respective machine rooms. In such an embodiment, the nodes in each machine room are considered related to one another, so the group of nodes in each machine room would comprise one set of nodes. A recovery mode would be associated with each machine room. In the event of a significant failure in one of the machine rooms, the recovery mode associated with that machine room could be activated so as be able to continue to provide services that had been provided by the nodes in the machine room that experienced the failure. This approach can be extended to deal with virtually any practical number of sets of nodes. For example, in a computer cluster that consisted of three machine rooms, denoted as X, Y and Z, with each machine room comprising a group of nodes, seven modes could be defined, with one mode being a "normal" mode and the remaining six modes being recovery modes. More particularly, there could be a first "normal" mode for situations where all three machine rooms X, Y, Z, are operational, a first recovery mode for situations where machine room X is down, a second recovery mode for situations where machine room Y is down, a third recovery mode for situations where machine room Z is down, a fourth recovery mode for situations where machine rooms X and Y are both down, a fifth recovery mode for situations where machine rooms Y and Z are both down, and a sixth recovery mode for situations where machine rooms X and Z are both down. In this context, "down" means that a pre-defined threshold number of nodes in the relevant machine room have become unavailable. An eighth recovery mode could be defined for situations in which all three machine rooms X, Y and Z are down, although such a mode would be of limited practical utility unless the computer cluster included additional nodes beyond machine rooms X, Y and Z.

In some instances, a computer cluster may operate in different modes at different times. For example, a computer cluster supporting an electronic commerce operation may have a first mode which is usually active during high-volume hours (e.g. daytime in the target market) and a second mode that is usually active during low-volume hours (e.g. nighttime in the target market). The first mode could be adapted to handle a higher volume of transactions, while the second mode could be adapted to accommodate the lower volume of transactions while also devoting resources to updating a product database. In situations where a computer cluster typically operates in more than one mode, it can be advantageous to have recovery modes that are specifically adapted to those operating modes. Thus, there may be sets of recovery modes, with a set of recovery modes being associated with a particular group of nodes, and each recovery mode in the set being associated with a particular operating mode. For example, if a threshold number of nodes in a given set became unavailable while the computer cluster was in the first mode noted above (i.e. daytime operations), then a first recovery mode in the set of recovery modes associated with that set of nodes, namely the recovery mode in that set that is associated with the daytime operation mode, would be implicated and the appropriate recovery mode would be designated. Conversely, if a threshold number of nodes in a given set became unavailable while the computer cluster was in the second mode noted above (i.e. nighttime operations), then a second recovery mode in the set or recovery modes associated with that set of nodes, namely the recovery mode in that set that is associated with the nighttime operation mode, would be implicated and the appropriate recovery mode would be designated.

In embodiments in which there are different modes that are intended to be active at different times (such as the exemplary nighttime operations and daytime operations modes referred to above), aspects of the present invention may be implemented in an arrangement wherein the modes are directly linked to schedules. Accordingly, at startup the software managing the computer cluster could check the system clock for the current time (which may include time, date and day of the week) to determine which mode to boot into. Additionally, such scheduling could be used to enable the software managing the computer cluster to automatically designate a new mode or modes when appropriate. For example, the exemplary nighttime operations mode could automatically be designated at 8:00 p.m. and the exemplary daytime operations mode could automatically be designated at 7:00 a.m. In some instances, different modes may be scheduled for different days of the week (e.g. there may be a "weekend" mode and a "weekday" mode.

Generally, a group of applications can be associated with any mode with which an individual application can be associated. In particular, a group of applications may be associated with the on-demand mode so as to constitute an on-demand group, which is useful for situations in which another application is dependent on a group of applications. All inactive members of an on-demand group are activated when the on-demand group is required (i.e. each member of the group is required) and all members of the on-demand group, other than those that should remain active for other reasons, are inactivated when the on-demand group is no longer required. An application within an on-demand group may remain active even where the on-demand group is no longer required because, for example, it is associated with another active mode, or is itself an on-demand application that is still individually required. Similarly, individual applications that are members of an on-demand group may be made eligible for activation, and activated, while the on-demand group is not required and is therefore inactive.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from at least one computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. The at least one processor is operable to cause execution of instructions contained in program code, either directly or indirectly.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method for managing a plurality of applications in a computer cluster, each application being able to run on a particular node in the computer cluster, wherein the computer cluster comprises a plurality of nodes hosted by a plurality of physical computers, the method comprising:
   maintaining associations among a plurality of modes and the plurality of applications, wherein each application is associated with at least one mode, and wherein the plurality of modes includes at least one recovery mode, each recovery mode being associated with a set of nodes that are related to one another;
   responsive to designation of at least one mode in the plurality of modes as active for the computer cluster so that there is at least one active mode for the computer cluster:
   explicitly flagging as eligible for activation each application that is associated with an active mode, including applications that are already active and associated with the active mode and applications that are inactive and associated with the active mode;

flagging as ineligible for activation each application that is inactive and is not associated with any active mode; and flagging as ineligible for activation and inactivating each application that is active and is not associated with any active mode;

wherein the steps of flagging as eligible, flagging as ineligible, and flagging as ineligible and inactivating are performed in any order, and wherein the inactivating is sequenced according to dependencies among the applications;

responsive to explicitly flagging as eligible for activation each application that is associated with an active mode, activating each application flagged as eligible for activation that is inactive; and responsive to a threshold number of nodes in the set of nodes becoming unavailable, designating as active for the computer cluster an appropriate recovery mode associated with the set of nodes that includes the threshold number of unavailable nodes so that at least one application that is equivalent to at least one corresponding application that had been available on at least one node in the threshold number of unavailable nodes becomes available on another node in the computer cluster, wherein the another node in the computer cluster is external to the set of nodes that includes the threshold number of unavailable nodes.

2. The method of claim 1, wherein the plurality of modes includes an on-demand mode that is deemed to be always active, wherein at least one application in the plurality of applications is associated with the on-demand mode to form at least one on-demand application, and wherein the method further comprises:

activating each on-demand application when such on-demand application is required and inactivating each on-demand application only when such on-demand application is not required, wherein the activating and inactivating of the at least one on-demand application is independent of any active mode other than the on-demand mode.

3. The method of claim 1, wherein activating each application flagged as eligible for activation is performed responsive to a request for activation.

4. The method of claim 1, wherein the plurality of modes includes a mode which is always active.

5. The method of claim 1, wherein the plurality of modes includes a default mode that is initially assigned to new applications introduced into the computer cluster.

6. A data processing system for managing a plurality of applications in a computer cluster, each application being able to run on a particular node in the computer cluster, wherein the computer cluster comprises a plurality of nodes hosted by a plurality of physical computers, the data processing system comprising a bus system; a communications unit coupled to the bus system; a memory coupled to the bus system, wherein the memory includes a set of instructions; and a processing unit coupled to the bus system, wherein the processing unit is operable to cause execution of the set of instructions to perform the following steps:

maintain associations among a plurality of modes and the plurality of applications, wherein each application is associated with at least one mode, and wherein the plurality of modes includes at least one recovery mode, each recovery mode being associated with a set of nodes that are related to one another;

responsive to a designation of at least one mode in the plurality of modes as active for the computer cluster, so that there is at least one active mode for the computer cluster:

explicitly flag as eligible for activation each application that is associated with an active mode, including applications that are already active and associated with the active mode and applications that are inactive and associated with the active mode;

flag as ineligible for activation each application that is inactive and is not associated with any active mode; and flag as ineligible for activation and inactivate each application that is active and is not associated with any active mode;

wherein the steps of flagging as eligible, flagging as ineligible, and flagging as ineligible and inactivating are performed in any order, and wherein the inactivating is sequenced according to dependencies among the applications;

responsive to explicitly flagging as eligible for activation each application that is associated with an active mode, activating each application flagged as eligible for activation that is inactive; and responsive to a threshold number of nodes in a set of nodes becoming unavailable, designate as active for the computer cluster an appropriate recovery mode associated with the set of nodes that includes the threshold number of unavailable nodes so that at least one application that is equivalent to at least one corresponding application that had been available on at least one node in the threshold number of unavailable nodes becomes available on another node in the computer cluster, wherein the another node in the computer cluster is external to the set of nodes that includes the threshold number of unavailable nodes.

7. The data processing system of claim 6, wherein the plurality of modes includes an on-demand mode that is deemed to be always active, wherein at least one application in the plurality of applications is associated with the on-demand mode to form at least one on-demand application, and wherein the processing unit is operable to execute the set of instructions to perform the following further steps:

activate each on-demand application when such on-demand application is required and inactivate each on-demand application only when such on-demand application is not required, wherein the activating and inactivating of the at least one on-demand application is independent of any active mode other than the on-demand mode.

8. The data processing system of claim 6, wherein activating each application flagged as eligible for activation is performed responsive to a request for activation.

9. The data processing system of claim 6, wherein the plurality of modes includes a mode which is always active.

10. The data processing system of claim 6, wherein the plurality of modes includes a default mode that is initially assigned to new applications introduced into the computer cluster.

11. A computer program product comprising at least one non-transitory computer-readable medium containing computer-usable instructions for managing a plurality of applications in a computer cluster, each application being able to run on a particular node in the computer cluster, wherein the computer cluster comprises a plurality of nodes hosted by a plurality of physical computers, wherein the instructions, when executed, cause a computer to:

maintain associations among a plurality of modes and the plurality of applications, wherein each application is associated with at least one mode, and wherein the plurality of modes includes at least one recovery mode, each recovery mode being associated with a set of nodes that are related to one another;

responsive to designation of at least one mode in the plurality of modes as active for the computer cluster so that there is at least one active mode for the computer cluster:
- explicitly flag as eligible for activation each application that is associated with an active mode, including applications that are already active and associated with the active mode and applications that are inactive and associated with the active mode;
- flag as ineligible for activation each application that is inactive and is not associated with any active mode; and
- flag as ineligible for activation and inactivate each application that is active and is not associated with any active mode;

wherein the steps of flagging as eligible, flagging as ineligible and inactivating and flagging as ineligible are performed in any order, and wherein the inactivating is sequenced according to dependencies among the applications;

responsive to explicitly flagging as eligible for activation each application that is associated with an active mode, activating each application flagged as eligible for activation that is inactive; and responsive to a threshold number of nodes in a set of nodes becoming unavailable, designate as active for the computer cluster an appropriate recovery mode associated with the set of nodes that includes the threshold number of unavailable nodes so that at least one application that is equivalent to at least one corresponding application that had been available on at least one node in the threshold number of unavailable nodes becomes available on another node in the computer cluster, wherein the another node in the computer cluster is external to the set of nodes that includes the threshold number of unavailable nodes.

12. The computer program product of claim 11, wherein the plurality of modes includes an on-demand mode that is deemed to be always active, wherein at least one application in the plurality of applications is associated with the on-demand mode to form at least one on-demand application, and wherein the computer-readable medium contains further computer-usable instructions which, when executed, cause a computer to further:

activate each on-demand application when such on-demand application is required and inactivate each on-demand application only when such on-demand application is not required, wherein the activating and inactivating of the at least one on-demand application is independent of any active mode other than the on-demand mode.

13. The computer program product of claim 11, wherein activating each application flagged as eligible for activation is performed responsive to a request for activation.

14. The computer-program product of claim 11, wherein the plurality of modes includes a mode which is always active.

15. The computer program product of claim 11, wherein the plurality of modes includes a default mode and wherein the computer-readable medium contains further computer-usable instructions which, when executed, cause a computer to initially associate new applications introduced into the computer cluster with the default mode.

* * * * *